United States Patent [19]

Hufnagel et al.

[11] 4,345,074
[45] Aug. 17, 1982

[54] PROCESS FOR THE MANUFACTURE OF A VIOLET ORGANIC PIGMENT, C.I. PIGMENT VIOLET 23

[75] Inventors: Theobald Hufnagel, Freigericht; Manfred Hetschko, Rodenbach, both of Fed. Rep. of Germany

[73] Assignee: Cassella Aktiengesellschaft, Frankfurt am Main Fechenheim, Fed. Rep. of Germany

[21] Appl. No.: 244,034

[22] Filed: Mar. 16, 1981

[30] Foreign Application Priority Data

Mar. 21, 1980 [DE] Fed. Rep. of Germany ....... 3010949

[51] Int. Cl.³ .......................................... C07D 265/34
[52] U.S. Cl. ..................................................... 544/99
[58] Field of Search ......................................... 544/99

[56] References Cited

PUBLICATIONS

Venkataraman, The Chemistry of Synthetic Dyes, vol. II, (1952), pp. 786 and 787.

BIOS Final Report No. 960—p. 75—German Dyestuffs and Dyestuffs Intermediates.

*Primary Examiner*—Henry R. Jiles
*Assistant Examiner*—Robert C. Whittenbaugh
*Attorney, Agent, or Firm*—Connolly and Hutz

[57] ABSTRACT

In the process for the manufacture of the organic pigment of the formula

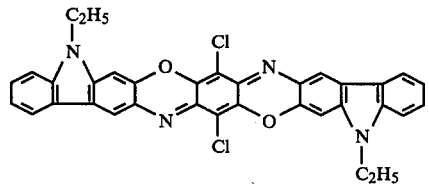

by condensing and cyclizing 3-amino-9-ethylcarbazole with excess tetrachlorobenzoquinone in an organic solvent in the presence of acid acceptors, the improvement comprises carrying out the condensation reaction in the presence of 0.1 to 4% of water, relative to the total weight of the reaction mixture.

3 Claims, 1 Drawing Figure

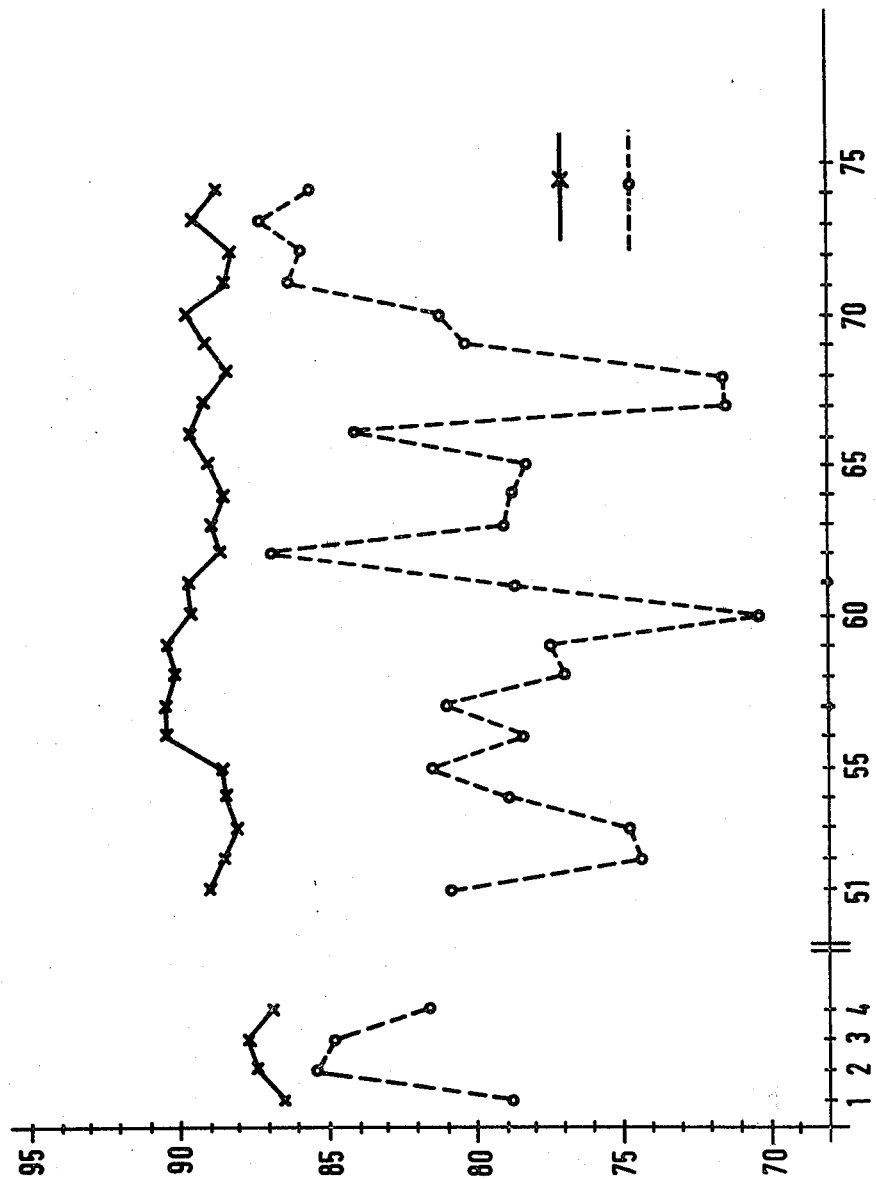

PROCESS FOR THE MANUFACTURE OF A VIOLET ORGANIC PIGMENT, C.I. PIGMENT VIOLET 23

The present invention relates to an improved process for the manufacture of the organic pigment of the formula I

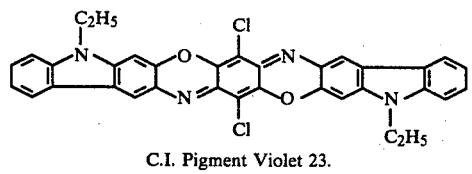

C.I. Pigment Violet 23.

C.I. Pigment Violet 23 has been known for over 50 years and in the course of this time has acquired a very great importance because of its outstanding properties. It is therefore manufactured on an industrial scale in large quantities. As long as the colorant has been known, the principal features of its manufacture have remained the same. Its synthesis is effected by reacting chloranil (tetrachloro-p-benzoquinone) with two mols of 3-amino-9-ethylcarbazole to give 2,5-di-(9-ethylcarbazol-3-ylamino)-3,6-dichloro-1,4-benzoquinone, followed by cyclisation to give the organic pigment of the formula I. (Compare Venkataraman, The Chemistry of Synthetic Dyes, Volume II (1952), pages 786 and 787). The following equations will serve to illustrate the reaction:

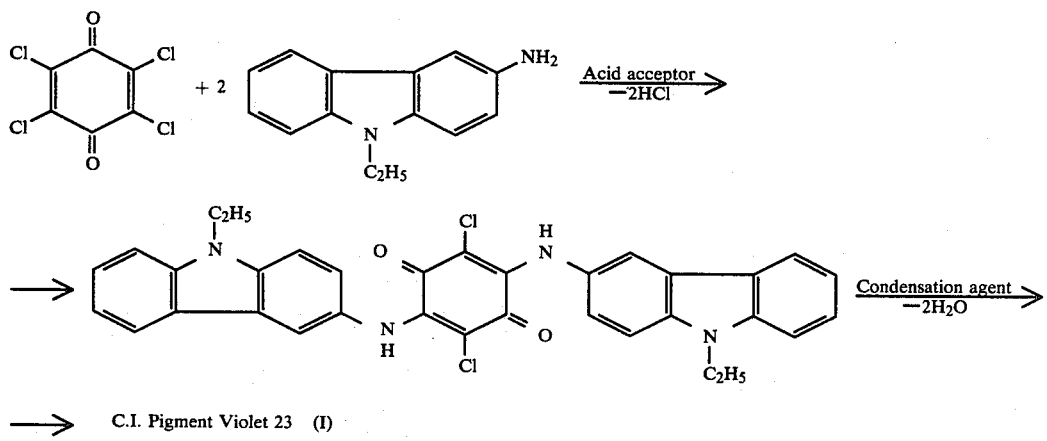

→ C.I. Pigment Violet 23 (I)

However, the processes indicated for carrying out this synthesis in the oldest patent specifications devoted to this organic pigment, German Patent Specification No. 517194 and British Patent Specification No. 387,565, have not proved to be very suitable; in particular they have given too low a yield. In view of the outstanding quality of the colorant and its continually increasing importance, these processes have, therefore, been worked upon often and intensively, with the aim of improving as far as possible the yield of the dyestuff and the form in which it is produced in manufacture.

Variations have been effected in respect of the solvents, the acid acceptor and the condensation agent which catalyses the cyclisation. Solvents which have been recommended are dichlorobenzene, trichlorobenzene, pyridine, nitrobenzene and mononitronaphthalene. The alkali metal acetates and carbonates have been recommended as the acid acceptors which are intended to intercept the hydrochloric acid formed in the first stage of the synthesis. The cyclisation reaction, which initially was carried out only by prolonged heating in high-boiling benzene derivatives, has later been carried out in the presence of condensation agents. Examples of condensation agents which have been recommended are metal chlorides (German Patent Specification No. 517194) or benzenesulphochloride (Venkataraman Loc.cit., Volume 2 (1952), page 787).

The addition of oxidising substances, such as ferric compounds, dinitrophenol or picric acid, and also, in particular, an excess of chloranil, has also been recommended for accelerating and improving the reaction.

The optimal state of the art at the present time is the operating process for the manufacture of C.I. Pigment Violet 23 described in Bios Report 960, page 75.

If specially pure starting materials are employed, this optimised operating process gives an acceptable yield of colorant, amounting to up to 85% of theory if the process is carried out carefully. Yields of even 89% can be obtained by this process on a large manufacturing scale if all the process factors are very carefully optimised. However, this process has one very serious disadvantage. It reacts extremely sensitively to differences in the quality of the starting materials, particularly differences in the quality of the chloranil. If, therefore, considerable losses, particularly of the expensive material 9-ethyl-3-aminocarbazole, are not acceptable in carrying out this large-scale manufacturing process, it is necessary to subject the chloranil to be employed to a preliminary test, batch by batch, and to employ, for the manufacture of C.I. Pigment Violet 23, only batches of chloranil having a standard of quality which assures a high yield.

The special selection of chloranil batches not only means a considerable additional outlay of labour prior to carrying out the industrial synthesis, but can also result in an accumulation of batches of chloranil which cannot be used in the best possible way for the process. The use of specially selected batches of chloranil for the known industrial process can also lead to secondary expenses, such as additional transport expenses, and can also result in shortages of raw materials, namely in cases where only chloranil of inadequate quality can be supplied over a prolonged period. The difficulties are increased further because there are no unambiguous analytical quality characteristics which make it possible to recognize clearly chloranil which can be employed for the manufacture of C.I. Pigment Violet 23 by the known industrial process and chloranil which cannot be so employed. The selection can only be effected by means of a preliminary trial in which the dyestuff is prepared on a laboratory scale. It has, therefore, also not yet been possible to manufacture chloranil with certainty, from the start, in a quality which meets the requirements of the known industrial process for the manufacture of C.I. Pigment Violet 23.

The considerable difficulties associated with the selection of special batches of chloranil of a particularly high-grade quality result in a situation in which, in practice, every kind of chloranil is in fact converted into C.I. Pigment Violet 23 by the known industrial process, and the yields are then reduced to approx. 70% when less suitable batches are employed. In practice, therefore, the known process carried out in industry for the manufacture of C.I. Pigment Violet 23 results in considerable fluctuations in yield and to serious losses, depending on the quality of the chloranil.

Numerous attempts have been made to determine the nature of the mechanism underlying the effect of the quality of chloranil on the yield of the process. In particular, the progress of the reaction has been followed by means of thin layer chromatography. In the course of this it has been found that poor qualities of chloranil lead to a considerable reduction in the rate of the reaction between chloranil and 9-ethyl-3-aminocarbazole. While when using good chloranil the reaction has progressed sufficiently after 6 to 7 hours that the batches contain only very small quantities of 9-ethyl-3-aminocarbazole, when poorer qualities of chloranil are employed, unreacted carbazole derivative can still be detected after 18 hours. If the attempt is made to complete the reaction by stirring the reaction batch for a still longer period or by increasing the temperature, dark-coloured, polymeric by-products are formed which merely contaminate the batch without making a substantial contribution to the yield of organic pigment.

It has now been found, surprisingly, that C.I. Pigment Violet 23 can be manufactured in an excellent yield by the known industrial manufacturing process, regardless of the quality of the chloranil employed, if a slight amount of water, as a rule 0.1 to 4% by weight, related to the total weight of the batch, is added to the reaction batch. The advantageous effect of adding water to the reaction batch could not have been expected. On the contrary, it was necessary to fear that the addition of water would have a considerably detrimental effect on the reaction, since in all the literature published hitherto concerning the process for the manufacture of C.I. Pigment Violet 23, reference is always expressly made to the fact that anhydrous operation is absolutely necessary in carrying out the process. Thus, in the operating process known from Bios Report 960, the o-dichlorobenzene used as the solvent for the reaction is incipiently distilled before use, that is to say sufficient of the dichlorobenzene is distilled off for all traces of water to be removed with certainty from the solvent. The sodium acetate used as the acid acceptor must also be anhydrous.

The present invention relates, therefore, to a process for the manufacture of the organic pigment of the formula I, C.I. Pigment Violet 23, by subjecting 3-amino-9-ethylcarbazole to a condensation reaction with excess tetrachlorobenzoquinone in an organic solvent in the presence of acid acceptors and, if appropriate, condensation agents, in which the condensation reaction is carried out in the presence of 0.1 to 4% by weight, preferably 0.15 to 1.8% by weight of water, relative to the total weight of the batch.

If the quantity of water falls short of 0.1% by weight, especially 0.15% by weight, relative to the total weight of the reaction mixture, the effect on the improvement of the yield falls off gradually, as would be expected. Particularly when chloranil batches of a particularly unfavourable quality are employed, it is not possible to achieve the desired objective. On the other hand, the effect on the yield of the addition of water increases as the quantity added increases, and, as a rule, the use of quantities of 0.25 to 0.85% by weight of water makes it possible to level out virtually completely the customary fluctuations in the quality of the chloranil. In the case of particularly poor qualities of chloranil, it can, however, be advisable to increase the quantity of water, about 1.2 to 1.8% by weight being sufficient in most cases. The addition of quantities of water beyond 1.8% by weight and especially 4% by weight makes no further significant improvement in the yield of pigment. However, it does not lead, in the laboratory, to any disadvantages either, but in industry can lead, in certain circumstances, to agglomeration of portions of the reaction batch.

At present it is not possible to indicate a mechanism for the effectiveness of the addition of water. It has been established by a thin layer chromatographic investigation of the reaction batches carried out by the process improved in accordance with the invention, that the rate of the reaction between chloranil and 9-ethyl-3-aminocarbazole is considerably increased and becomes independent of the quality of the chloranil. The effect of adding water is to achieve, after as short a time as approx. 3 hours and with any quality of chloranil, the same degree of conversion that occurs only after 6 to 7 hours in the conventional process and if a very good quality of chloranil is employed.

The process improved in accordance with the invention also provides an additional advantage. A chloranil excess of approx. 50% is used in the known industrial process. If the attempt is made, in this known process, to reduce the excess of chloranil, the yield of organic pigment falls off at once and, in addition, the product is obtained in a poorer form, so that certain difficulties arise in working up the batches.

As far as we are aware, there is no demonstrable reaction mechanism which provides a conclusive explanation of the effect of the excess of chloranil on the yield and the form of the dyestuff. It has now been found, that, when carrying out the process improved in accordance with the invention, that is to say with water added, the excess of chloranil can be reduced drastically. In laboratory experiments the use of an excess of only 18% of chloranil has made it possible to obtain the same good yields as are obtained with the 50% excess used hitherto. Even using an excess of only 8% of chloranil, it has still been possible to obtain a yield of 87% of theory by means of the process improved in accordance with the invention.

The process improved in accordance with the invention is carried out essentially in exactly the same way as the known industrial process, with the single difference that, after all the reactants have been introduced into the organic solvent, the required quantity of water is also metered in additionally. The addition of water is appropriately effected by adding it gradually, while stirring vigorously. The implementation of the process improved in accordance with the invention and of the process according to the state of the art for the manufacture of C.I. Pigment Violet 23 are illustrated by illustrative Embodiment 1 and by Comparison Example 2. A particularly effective survey of the effect of the addition of water, according to the invention, is afforded by the graphical representation of the results of serial experiments carried out analogously to Illustrative Embodiment 1 and Comparison Example 2. The same quality of chloranil was employed for each two experiments forming a pair; samples of chloranil which had been taken from current deliveries of chloranil in a statistical time sequence were used within the series of experiments. In order to give a clear representation of the experimental results, the numbers of the experiments were plotted along the abscissa of a system of coordinates, while the yields obtained in the experiments were plotted along the ordinate. The points representing the results of the comparison test were linked to one another by a dotted line, while the points representing the process according to the invention were linked to one another by a continuous line. It will be seen that the considerable fluctuations in yield of the known process, which are caused by fluctuating chloranil quality, do not occur in the process according to the invention.

EXAMPLE 1

100 g of aminoethylcarbazole, 42.5 g of anhydrous sodium acetate and 87.5 g of chloranil are introduced at 50° C. into 1,940 g of o-dichlorobenzene. 6.3 ml of water are then added dropwise, while stirring vigorously. The mixture is then stirred for 3 hours at 60°–65° C. At this point in time, 9-ethyl-3-aminocarbazole can virtually no longer be detected in the reaction mixture. The batch is then heated at 115° C. in vacuo for 5 hours, until acetic acid can no longer be detected in the distillate. The mixture is then heated to 150° C. without application of a vacuum and 45 g of benzenesulphochloride are added at this temperature.

The mixture is then warmed to 176° to 180° C. and is stirred at this temperature until no further acetic acid distils off (4 to 8 hours). The mixture is then cooled, diluted with 500 g of o-dichlorobenzene and filtered at 100° C. on a suction filter. The precipitate is washed with 200 ml of o-dichlorobenzene, warmed to 100° C., until a sample of the reaction product, when boiled up, no longer exhibits a blue colour in the filtrate, but only a reddish fluorescence. The o-dichlorobenzene is removed from the filter cake by steam distillation and the product is then filtered off once more and washed with water. Finally, it is dried in a tray at 100° C.

The yield is 85.5% of theory, relative to aminoethylcarbazole.

EXAMPLE 2

(Comparison in accordance with the state of the art)

100 g of aminoethylcarbazole, 42.5 g of anhydrous sodium acetate and 87.5 g of chloranil are introduced at 50° C. into 1,940 g of o-dichlorobenzene which has been freed from water by incipient distillation. The materials must be dried immediately before use. The mixture is stirred for 6 hours at 60°–65° C. At this point in time, only traces of 9-ethyl-3-aminocarbazole can be detected in the reaction mixture. The mixture is then heated at 115° C. in vacuo for 5 hours, until acetic acid can no longer be detected in the distillate. The mixture is then heated to 150° C. without the application of a vacuum and 45 g of benzenesulphochloride are added at this temperature. The mixture is then warmed to 176° to 180° C. and is stirred at this temperature until no further acetic acid distils off (4 to 8 hours). The mixture is then cooled, diluted with 500 g of o-dichlorobenzene and filtered at 100° C. on a suction filter. The precipitate is washed with 200 ml of o-dichlorobenzene, warmed to 100° C. A sample of the reaction mixture, when boiled up, then no longer exhibits a blue colour in the filtrate, but only a reddish fluorescence. The o-dichlorobenzene is removed from the filter cake by steam distillation and the product is then once more filtered off and washed with water. Finally, it is dried at 100° C. in a tray.

The yield is 78.8% of theory, relative to aminoethylcarbazole.

The organic solvents that may be used for the process of the invention are, in particular, the high-boiling solvents known in the prior-art processes, that is, for example, monochlorobenzene, trichlorobenzene, nitrobenzene, pyridine, mononitronaphthalene, but also tetrachlorobenzene, dichlorotoluene, trichlorotoluene, naphthalene, chloronaphthalene, diphenyl, etc. O-dichlorobenzene is preferred as solvent.

What is claimed is:

1. In the process for the manufacture of the organic pigment of the formula

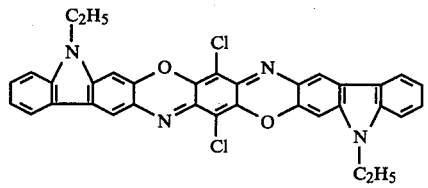

by condensing and cyclizing 3-amino-9-ethylcarbazole with excess tetrachlorobenzoquinone in an organic solvent in the presence of acid acceptors, the improvement comprises carrying out the condensation reaction in the presence of 0.1 to 4% of water, relative to the total weight of the reaction mixture.

2. The process according to claim 1 wherein the condensation reaction is carried out in the presence of 0.15 to 1.8% by weight of water.

3. The process according to claim 1 wherein the condensation reaction is carried out in the presence of 0.25 to 0.85% by weight of water.

* * * * *